(12) United States Patent
Matsutani

(10) Patent No.: US 10,409,503 B2
(45) Date of Patent: Sep. 10, 2019

(54) STORAGE SYSTEM WHICH MAKES BACKUPS OF INPUT DATA

(71) Applicant: Konica Minolta, Inc., Tokyo (JP)

(72) Inventor: Noritsugu Matsutani, Aichi-ken (JP)

(73) Assignee: Konica Minolta, Inc., Tokyo (JP)

( * ) Notice: Subject to any disclaimer, the term of this patent is extended or adjusted under 35 U.S.C. 154(b) by 16 days.

(21) Appl. No.: 14/936,229

(22) Filed: Nov. 9, 2015

(65) Prior Publication Data

US 2016/0132261 A1 May 12, 2016

(30) Foreign Application Priority Data

Nov. 7, 2014 (JP) ................................. 2014-226846

(51) Int. Cl.
*G06F 3/06* (2006.01)
*G06F 11/10* (2006.01)

(52) U.S. Cl.
CPC ............ *G06F 3/0619* (2013.01); *G06F 3/064* (2013.01); *G06F 3/065* (2013.01); *G06F 3/0689* (2013.01); *G06F 11/1076* (2013.01)

(58) Field of Classification Search
USPC ........................................................ 711/144
See application file for complete search history.

(56) References Cited

U.S. PATENT DOCUMENTS 4,623,244 A * 11/1986 Andrews ............... G03G 15/221
355/24
5,740,028 A * 4/1998 Sugiyama ............. G06F 3/1294
700/28
6,638,212 B1 * 10/2003 Oshima ................. A61B 1/0002
348/72
7,212,307 B2 * 5/2007 Kanda ................... G06F 11/008
358/1.16
7,631,218 B2 * 12/2009 Daikokuya .......... G06F 11/1076
714/6.12
7,725,657 B2 * 5/2010 Hasenplaugh ...... G06F 12/0842
711/130

(Continued)

FOREIGN PATENT DOCUMENTS

JP 2002-171412 A 6/2002
JP 2004-525464 A 8/2004

(Continued)

OTHER PUBLICATIONS

Office Action in corresponding Japanese Patent Application No. 2014-226846 dated Nov. 29, 2016, with translation (8 pages).

*Primary Examiner* — Mano Padmanabhan
*Assistant Examiner* — Jean C Edouard
(74) *Attorney, Agent, or Firm* — Osha Liang LLP

(57) ABSTRACT

An image forming apparatus (storage system) has a first and a second HDD, and a temporary storage unit. The apparatus divides input data into a first and a second divided data pieces and writes the first and the second divided data pieces in the temporary storage unit. The apparatus transfers the written first divided data piece to the first HDD and transfers the written second divided data piece to the second HDD. The apparatus copies the transferred first and second divided data pieces into the temporary storage unit. The apparatus makes a backup of the copied first divided data piece in the second HDD, and makes a backup of the copied second divided data piece in the first HDD.

18 Claims, 22 Drawing Sheets

(56) References Cited

U.S. PATENT DOCUMENTS

| | | | | |
|---|---|---|---|---|
| 8,441,693 B2* | 5/2013 | Aritomi | G03G 21/04 | 358/1.14 |
| 2002/0025068 A1* | 2/2002 | Mishima | G06T 9/005 | 382/166 |
| 2002/0026543 A1* | 2/2002 | Tojima | G06F 13/30 | 710/22 |
| 2004/0006604 A1* | 1/2004 | Kawashima | G06F 3/0605 | 709/213 |
| 2004/0064633 A1* | 4/2004 | Oota | G06F 3/0613 | 711/100 |
| 2004/0146313 A1* | 7/2004 | Uchizono | G03G 15/5004 | 399/75 |
| 2004/0169880 A1* | 9/2004 | Nakanishi | G06F 17/30244 | 358/1.15 |
| 2004/0212832 A1* | 10/2004 | Shibata | H04N 1/00347 | 358/1.16 |
| 2005/0063014 A1* | 3/2005 | Shinotsuka | H04N 1/40081 | 358/3.1 |
| 2007/0150678 A1* | 6/2007 | Tsukada | G06F 11/1456 | 711/162 |
| 2007/0282925 A1* | 12/2007 | Son | G06F 11/1451 | |
| 2007/0285734 A1* | 12/2007 | Matsueda | H04N 1/00209 | 358/468 |
| 2008/0208929 A1* | 8/2008 | Phillipi | G06F 11/1451 | |
| 2008/0253573 A1* | 10/2008 | Sakurai | H04N 1/32609 | 380/278 |
| 2009/0150629 A1* | 6/2009 | Noguchi | G06F 11/1402 | 711/162 |
| 2009/0257086 A1* | 10/2009 | Takeuchi | H04N 1/00222 | 358/1.15 |
| 2009/0300306 A1* | 12/2009 | Satou | G06F 3/061 | 711/162 |
| 2009/0310173 A1* | 12/2009 | Iwai | G03G 15/5016 | 358/1.15 |
| 2010/0058012 A1* | 3/2010 | Okada | G06F 11/1461 | 711/162 |
| 2010/0149576 A1* | 6/2010 | Morihara | G06K 15/1822 | 358/1.13 |
| 2010/0161923 A1* | 6/2010 | GadelRab | G06F 12/02 | 711/162 |
| 2010/0180094 A1* | 7/2010 | Min | G06F 11/2058 | 711/162 |
| 2011/0080597 A1* | 4/2011 | Yamada | H04N 1/3877 | 358/1.2 |
| 2011/0276823 A1* | 11/2011 | Ueno | G06F 11/1458 | 714/4.11 |
| 2012/0047340 A1* | 2/2012 | Inaba | G06F 11/2069 | 711/162 |
| 2012/0054457 A1* | 3/2012 | Sasage | G06F 3/0613 | 711/162 |
| 2012/0089799 A1* | 4/2012 | Wei | G06F 11/1662 | 711/162 |
| 2012/0198189 A1* | 8/2012 | Akiba | H04N 1/32363 | 711/162 |
| 2012/0268757 A1* | 10/2012 | Honma | H04N 1/40 | 358/1.9 |
| 2013/0006930 A1* | 1/2013 | Taniguchi | G06F 16/273 | 707/625 |
| 2013/0027718 A1* | 1/2013 | Fujii | | 358/1.9 |
| 2013/0044355 A1 | 2/2013 | Teshima | | |
| 2013/0063755 A1* | 3/2013 | Stevenson | G03G 15/5004 | 358/1.13 |
| 2013/0067275 A1* | 3/2013 | Watanabe | G06F 11/1092 | 714/6.24 |
| 2013/0070290 A1* | 3/2013 | Hayashi | G06F 3/121 | 358/1.15 |
| 2013/0151803 A1* | 6/2013 | Tofano | G06F 3/0641 | 711/165 |
| 2013/0227237 A1* | 8/2013 | Tashiro | G06F 3/0608 | 711/170 |
| 2013/0229683 A1* | 9/2013 | Nakayama | G06K 15/402 | 358/1.15 |
| 2013/0229684 A1* | 9/2013 | Yasuzaki | H04N 1/00127 | 358/1.15 |
| 2014/0074786 A1* | 3/2014 | Leggette | G06F 17/30174 | 707/638 |
| 2014/0223131 A1* | 8/2014 | Agarwal | G06F 13/1615 | 711/165 |
| 2015/0170375 A1* | 6/2015 | Ito | H04N 1/6027 | 382/167 |

FOREIGN PATENT DOCUMENTS

| | | |
|---|---|---|
| JP | 2008-131419 A | 6/2008 |
| JP | 2009-230608 A | 10/2009 |
| JP | 2010-198424 A | 9/2010 |
| JP | 2011-068012 A | 4/2011 |
| JP | 2013-041430 A | 2/2013 |

* cited by examiner (R(8bit), G(8bit), G(8bit))

FIG.10

|  | R | G | B | |
|---|---|---|---|---|
| 1ST | 0 or 1 | 0 or 1 | 0 or 1 | ~PX |
| 2ND | 0 or 1 | 0 or 1 | 0 or 1 | |
| 3RD | 0 or 1 | 0 or 1 | 0 or 1 | |
| 4TH | 0 or 1 | 0 or 1 | 0 or 1 | |
| 5TH | 0 or 1 | 0 or 1 | 0 or 1 | |
| 6TH | 0 or 1 | 0 or 1 | 0 or 1 | |
| 7TH | 0 or 1 | 0 or 1 | 0 or 1 | |
| 8TH | 0 or 1 | 0 or 1 | 0 or 1 | |

FIG.12

DIVIDED DATA PIECE A

| BIT PLANE ~DPR1 | BIT PLANE ~DPG5 |
| BIT PLANE ~DPR3 | BIT PLANE ~DPG7 |
| BIT PLANE ~DPR5 | BIT PLANE ~DPB1 |
| BIT PLANE ~DPR7 | BIT PLANE ~DPB3 |
| BIT PLANE ~DPG1 | BIT PLANE ~DPB5 |
| BIT PLANE ~DPG3 | BIT PLANE ~DPB7 |

DIVIDED DATA PIECE B

| BIT PLANE ~DPR2 | BIT PLANE ~DPG6 |
| BIT PLANE ~DPR4 | BIT PLANE ~DPG8 |
| BIT PLANE ~DPR6 | BIT PLANE ~DPB2 |
| BIT PLANE ~DPR8 | BIT PLANE ~DPB4 |
| BIT PLANE ~DPG2 | BIT PLANE ~DPB6 |
| BIT PLANE ~DPG4 | BIT PLANE ~DPB8 |

FIG.14
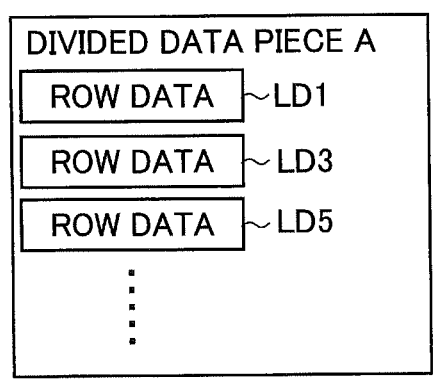
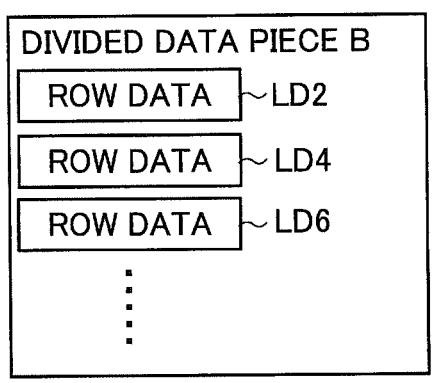

FIG.18

PRIORITY TABLE

| PRIORITY | DATA TYPE |
|---|---|
| P1 | DATA OF FACSIMILE RECEIVE JOB |
| P1 | DATA OF MAIL RECEIVE JOB |
| P1 | DATA STORED IN BOX |
| P2 | DATA OF PRINT JOB |
| P2 | DATA OF OTHER RECEIVE JOBS |
| P3 | DATA OF COPY JOB |
| P3 | DATA OF FACSIMILE SEND JOB |
| P3 | DATA OF MAIL SEND JOB |
| P3 | DATA OF OTHER SEND JOBS |

STORAGE SYSTEM WHICH MAKES BACKUPS OF INPUT DATA

This application is based on Japanese Patent Application No. 2014-226846 filed with the Japan Patent Office on Nov. 7, 2014, the entire content of which is hereby incorporated by reference.

BACKGROUND OF THE INVENTION

Field of the Invention

This invention relates to a storage system, a control program for a storage system, and a controller. More specifically, this invention relates to a storage system which has a first and a second fixed storage device, a control program for the storage system, and a controller.

Description of the Related Art

According to improvement of high resolution of video data and image data, and networks proliferation etc., it is required to increase largely recording capacity for fixed storage devices such as a HDD (Hard Disk Drive), a SSD (Solid State Drive), or the like. It is required for a storage system with a fixed storage device, to read/write data fast (improve performance) and store data safely (improve the backup function).

In case that a storage system stores all the data in one fixed storage device, all the data may be lost by the occurrence of trouble in the fixed storage device. In particular, trouble can easily arise in HDDs, since HDDs have movable parts.

There are technologies of RAID (Redundant Arrays of Inexpensive Disks) using a plurality of fixed storage devices, to improve performance and the backup function of a storage system. RAID has a plurality of writing methods such as RAID0, RAID1, or the like.

RAID0 is a technique which is so called a striping. When data writing by RAID0, data is divided into a plurality of divided data pieces by the block. Each of a plurality of divided data pieces is written in the corresponding fixed storage device. When data reading by RAID0, the divided data pieces are read from each of a plurality of fixed storage devices in parallel. Herewith, writing speed for the fixed storage device can be improved, and the performance of the storage system can be improved.

RAID1 is a technique which is so called mirroring. When data writing by RAID1, data is copied. Each of same data pieces are written in a plurality of fixed storage devices. When data reading by RAID1, data pieces are read from only one normal fixed storage device, out of the plurality of fixed storage devices. Herewith, when trouble occurs at a fixed storage device out of a plurality of fixed storage devices, the data can be read from a normal fixed storage device. Therefore, the backup function of the storage system can be improved.

Documents 1 to 3 below disclose techniques relating to the RAID. Document 1 below discloses a storage control method of a storage device which has a plurality of HDDs. According to the storage control method, the storage device stores data by using two storage methods of a divisional storage method (RAID0) in which data is divided for a plurality of HDDs and a duplication storage method (RAID1) in which data is duplicated and same data are stored in a plurality of HDDs. The storage device stores acquired data by using the divisional storage method or the duplication storage method in response to the data type.

Document 2 below discloses a technique which determines the most suitable transferring method for job input. An MFP (Multifunction Peripheral) disclosed in Document 2 below has a plurality of HDDs for storing data, and uses two HDDs as a single virtual storage device. The MFP determines a transferring method (RAID0 or RAID1) with respect to the two HDDs, based on the type of the job input. The MFP transfers data to each of two HDDs, based on the determined transferring method.

Document 3 below discloses an image forming apparatus which has more than two storage devices which can perform mirroring and striping. The image forming apparatus makes all the storage devices perform striping. On the other hand, the image forming apparatus makes more than one storage devices except for at least one storage device perform mirroring. When a storage device fails and the storage device was performing mirroring, the image forming apparatus replaces the failed storage device with a storage device which was not performing mirroring, as an alternative storage device. Then, the image forming apparatus continues mirroring. The image forming apparatus continues striping at all storage devices except for the failed storage device.

DOCUMENTS

[Document 1] Japan Patent Publication No. 2010-198424
[Document 2] Japan Patent Publication No. 2011-068012
[Document 3] Japan Patent Publication No. 2013-41430

The writing methods of RAID have advantages and disadvantages. According to the conventional technique, the improvement of performance and the improvement of the backup function of the storage system cannot go together. When adopting RAID0, writing speed to the fixed storage device can increase and the performance can be improved. However, in case that one fixed storage device failed, all the data becomes useless and the backup function is lost. When adopting RAID1, the backup function of the storage system can be improved. However, the storage capacity of the fixed storage device decreases, and the performance decreases. It is caused by writing each of same data pieces in each of a plurality of fixed storage devices.

According to techniques of Documents 1 and 2, either RAID0 or RAID1 is adopted in response to the data type or the job input. Therefore, they have a problem in that the improvement of performance and the improvement of the backup function of the storage system cannot go together. In particular, in case that the storage system is an MFP and the MFP executes processes in which both the performance and the backup function are needed, the problem is really serious. The processes in which both the performance and the backup function are needed are "storing copied data", "storing facsimile data", or "storing data in a designated folder", for example.

According to the technique in Document 3, the improvement of performance and the improvement of the backup function can go together. On the other hand, it requires more than 2 storage devices. The technique in Document 3 has a problem in which the cost and the installation area increase.

This invention is achieved to solve the above problems. The object is to provide a sophisticated storage system, a sophisticated control program for a storage system, and a sophisticated controller.

SUMMARY OF THE INVENTION

To achieve the above object, according to one aspect of the invention, a storage system comprising: a first and a second fixed storage devices; a temporary storage unit for storing data temporarily; and a processor, wherein the processor is configured to: divide input data into a first and a second divided data pieces; write the first and the second divided data pieces in the temporary storage unit; transfer the written first divided data piece to the first fixed storage device and transfer the written second divided data piece to the second fixed storage device; copy the transferred first and second divided data pieces in the temporary storage unit at required timing after the transfer; and make a backup of the copied first divided data piece in the second fixed storage device and make a backup of the copied second divided data piece in the first fixed storage device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 schematically shows a structure of brightness information of each of primary colors of one pixel.

FIG. 12 schematically shows structures of divided data pieces A and B which were divided by the first divisional method.

FIG. 14 schematically shows structures of divided data pieces A and B which were divided by the second divisional method.

FIG. 18 schematically shows a priority table stored by the controller, according to the embodiment of this invention.

DESCRIPTION OF THE PREFERRED EMBODIMENTS

The embodiment of this invention will be explained in the followings, based on the Figures.

In the following embodiments, an image forming apparatus as a storage system will be explained. The image forming apparatus may be an MFP, a facsimile device, a printer, a copying machine, or the like. The storage system may be an image forming apparatus, a PC (Personal Computer), a server apparatus, a portable terminal device, a scanner device, or the like.

(A Structure of the Image Forming Apparatus)

Firstly, a structure of the image forming apparatus will be explained.

Figure 1:
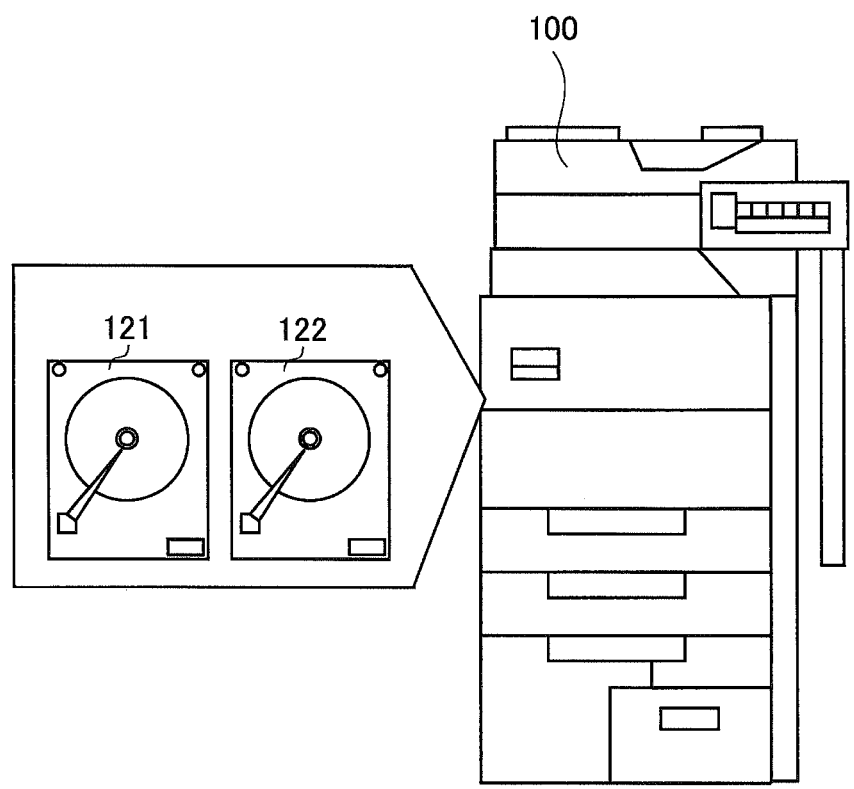
FIG. 1 shows an appearance of an image forming apparatus according to the embodiment of this invention.

FIG. 1 shows an appearance of an image forming apparatus according to the embodiment of this invention.

Referring to FIG. 1, image forming apparatus 100 of this embodiment (an example of a storage system) is an MFP, which has a scanner function, a copying function, a function of a printer, a facsimile function, a data transmitting function, and a server function. Image forming apparatus 100 has a first built-in HDD 121 (an example of a first fixed storage device) and a second built-in HDD 122 (an example of a second fixed storage device).

Figure 2:
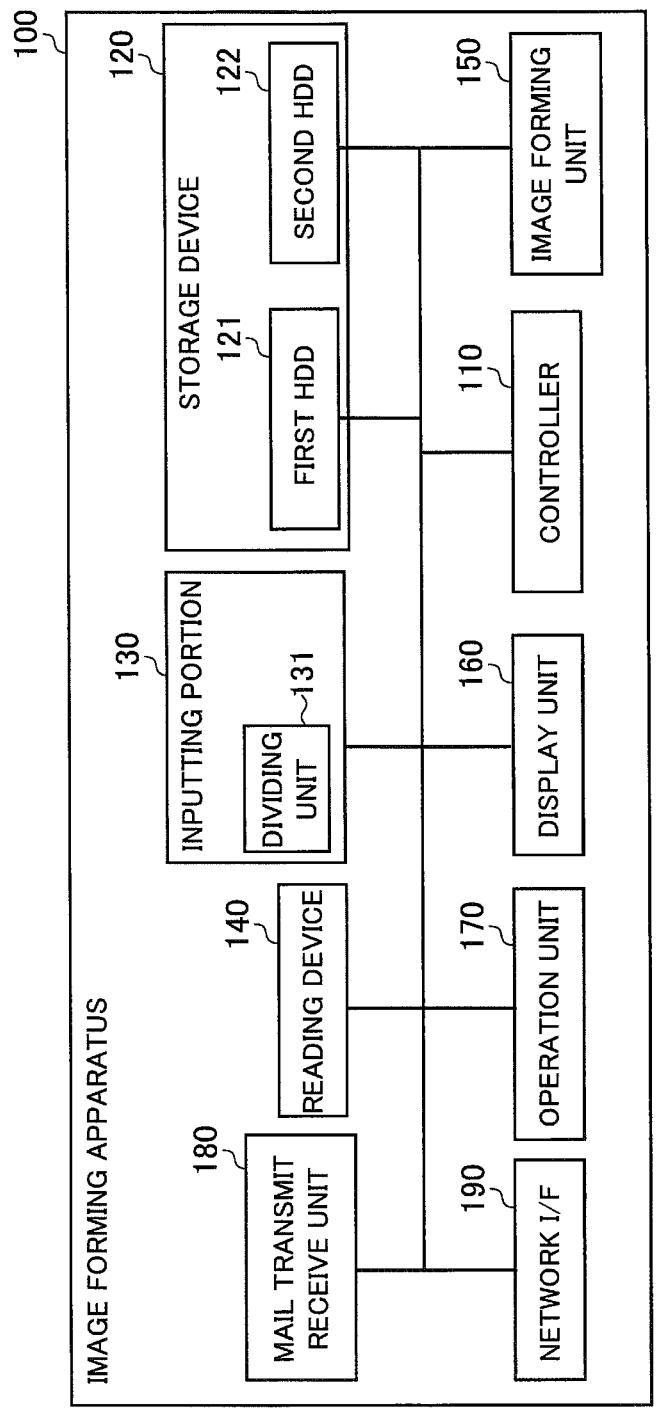
FIG. 2 shows a block diagram of a hardware configuration of the image forming apparatus according to the embodiment of this invention.

FIG. 2 shows a block diagram of a hardware configuration of the image forming apparatus according to the embodiment of this invention.

Referring to FIG. 2, image forming apparatus 100 is equipped with controller 110, storage device 120, inputting portion 130, reading device 140, image forming unit 150, display unit 160, operation unit 170, mail transmit and receive unit 180, and network I/F 190. Controller 110, and storage device 120, inputting portion 130, reading device 140, image forming unit 150, display unit 160, operation unit 170, mail transmit and receive unit 180 and network I/F 190 are bilaterally connected with each other.

Controller 110 controls behavior of the entire image forming apparatus. Controller 110 is configured with CPUs (Central Processing Unit), ROMs (Read Only Memory), RAMs (Random Access Memory), and so on. The CPUs execute processes based on control programs. ROMs store control programs to be executed by the CPUs, various tables, and so on. The RAMs are working memories for the CPUs.

Storage device 120 is a subsidiary storage device, and includes first HDD 121 and second HDD 122. Each of first HDD 121 and second HDD 122 works, being independent of each other.

Inputting portion 130 receives data input. The input data are, for example, data related to facsimile transmitting jobs or receiving job, data related to mail transmitting jobs or receiving jobs, data related to print jobs, data related to copy jobs (image data read by reading device 140), and so on. Inputting portion 130 includes dividing unit 131. Dividing unit 131 divides data input into two divided data pieces based on controlling by controller 110. Dividing unit 131 may be included in controller 110, as substitute for being included in inputting portion 130.

Reading device 140 reads images of documents. Display unit 160 displays various information on an operation panel (which is not shown in Figures). Operation unit 170 receives various operations via the operation panel. Mail transmit and receive unit 180 transmits and receives e-mails. Network I/F 190 transmits and receives various kinds of information via networks, with external devices (which are not shown in Figures) on the networks.

Image forming unit 150 is roughly configured with a toner image forming unit, a fixing device, a sheet conveying unit, and so on. Image forming unit 150 forms images on sheets by using electrophotographic technology, for example. Toner image forming unit synthesizes images of four colors by using a so-called tandem system, and forms colored images on sheets (recording media). The toner image forming unit is configured with photo conductors for colors of C (cyan), M (magenta), Y (yellow) and K (black), a secondary transfer belt on which toner images are transferred (the first transfer) from the photo conductors, a transfer unit to transfer (the second transfer) the images from the secondary transfer belt to sheets, and so on. The fixing device has a heating roller and a pressure roller. The fixing device conveys sheets on which toner images were formed, by the heating roller and the pressure roller which pinch the sheets. The fixing device heats and applies pressure on the sheets. Herewith, the fixing device melts and fixes adhered toner on the sheets to form images on the sheets. The sheet conveying unit is configured with paper feeding rollers, conveying rollers, motors to drive the rollers, and so on. The sheet conveying unit feeds sheets from a paper feeding cartridge, to convey the sheets in the inner part of a chassis of the image forming apparatus. The sheet conveying unit discharges sheets on which images were formed from the chassis of the image forming apparatus to a copy receiving tray or the like.

Figure 3:
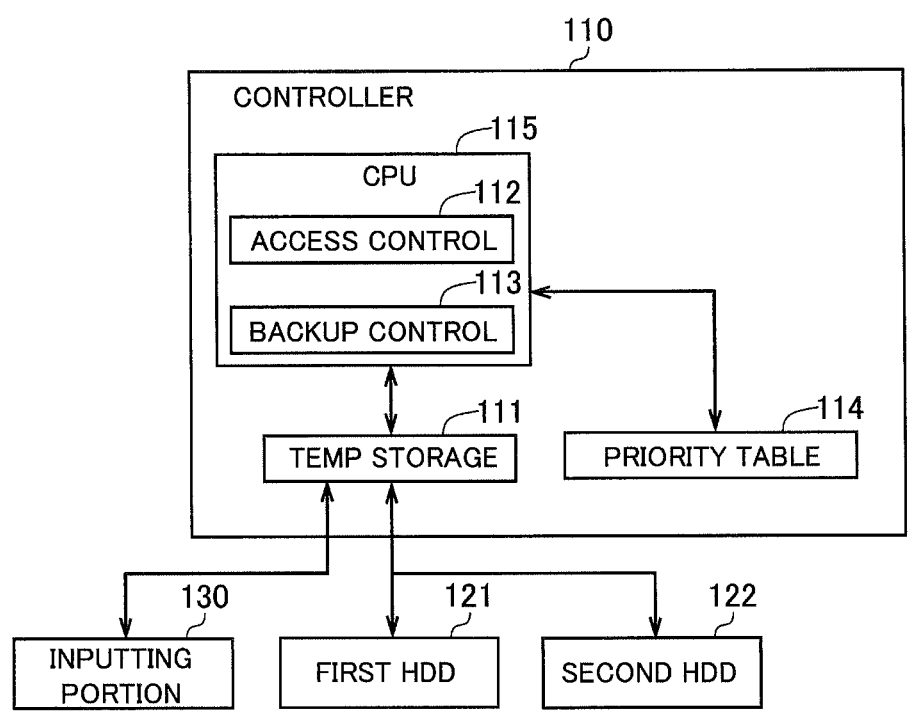
FIG. 3 shows a block diagram of a function structure (a CPU structure) of the controller, according to the embodiment of this invention.

FIG. 3 shows a block diagram of a function structure (a CPU structure) of the controller, according to the embodiment of this invention.

Referring to FIG. 3, controller 110 includes temporary storage unit 111, access control unit 112, backup control unit 113, and priority table storage unit 114. Access control unit 112 and backup control unit 113 are configured with CPU 115.

Temporary storage unit 111 is a main storage device for temporarily storing various data such as divided data pieces etc. to be stored in first HDD 121 and second HDD 122. Temporary storage unit 111 performs bilaterally communication with CPU 115, first HDD 121, second HDD 122, and inputting portion 130.

Access control unit 112 controls access processes (normal storing processes for data) to each of first HDD 121 and second HDD 122.

Backup control unit 113 controls data backup processes.

Priority table storage unit 114 stores a priority table (FIG. 18).

When image forming apparatus 100 receives original data input, image forming apparatus 100 executes a normal storing process for the original data. At the required timing after the normal storing process, image forming apparatus 100 executes a backup process for the original data.

(An Overview of the Normal Storing Process)

Firstly, an overview of the normal storing process will be explained.

FIGS. 4 to 7 are for explanation pertaining to the normal storing process which is executed by the image forming apparatus, according to the embodiment of this invention.

Figure 4:
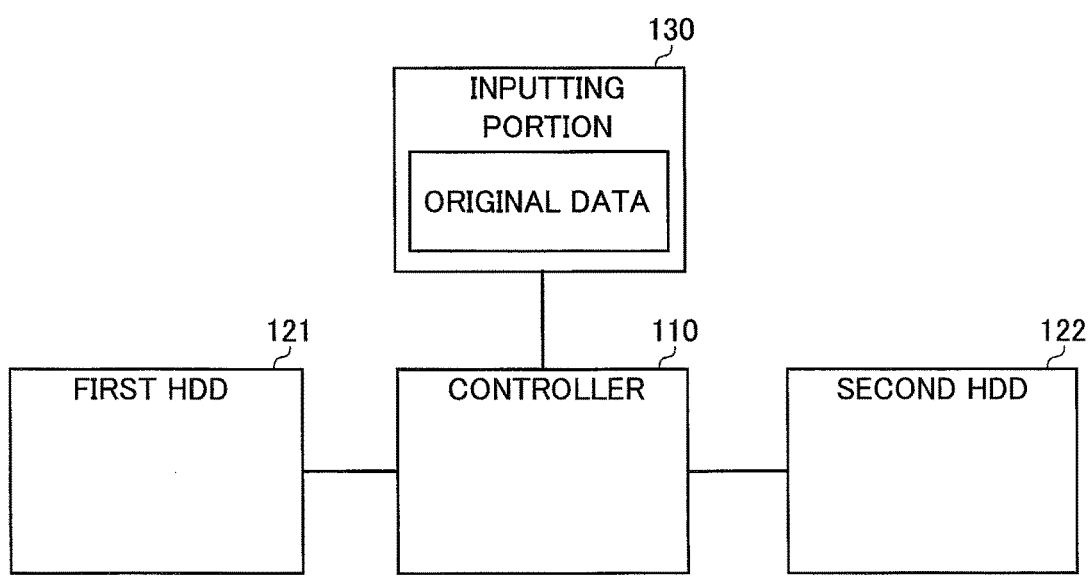
FIG. 4 is the first figure for explanation pertaining to a normal storing process which is executed by an image forming apparatus, according to the embodiment of this invention.

Referring to FIG. 4, inputting portion 130 receives original data input. The original data is, for example, image data read by reading device 140.

Figure 5:
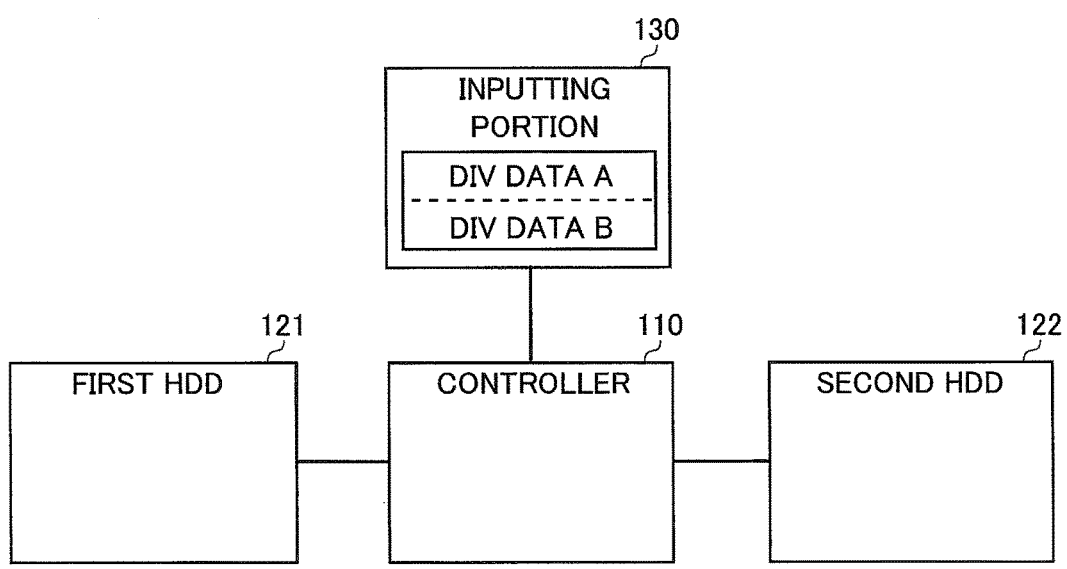
FIG. 5 is the second figure for explanation pertaining to a normal storing process which is executed by an image forming apparatus, according to the embodiment of this invention.

Referring to FIG. 5, inputting portion 130 divides the input original data into divided data pieces A and B, by dividing unit 131. Preferably, divided data pieces A and B are same size, being acquired by dividing the original data equally between the two. Preferably, each of divided data pieces A and B includes information related to job types of the relevant job, for the convenience when image forming apparatus 100 executes backup processes.

Figure 6:
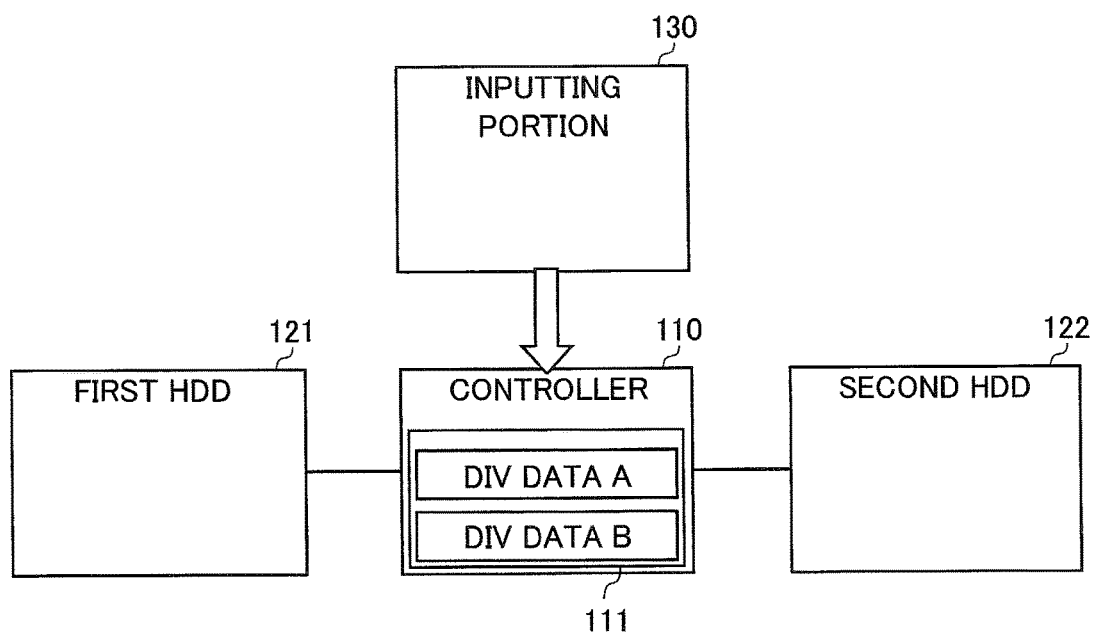
FIG. 6 is the third figure for explanation pertaining to a normal storing process which is executed by an image forming apparatus, according to the embodiment of this invention.

Referring to FIG. 6, inputting portion 130 moves divided data pieces A and B to controller 110, and writes them in temporary storage unit 111 of controller 110. Temporary storage unit 111 temporarily stores divided data pieces A and B.

Figure 7:
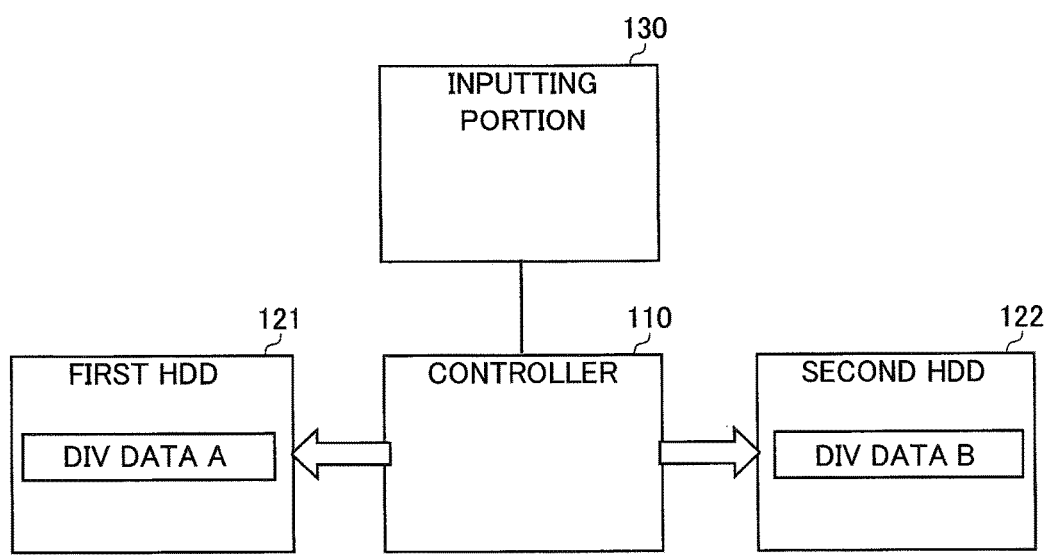
FIG. 7 is the fourth figure for explanation pertaining to a normal storing process which is executed by an image forming apparatus, according to the embodiment of this invention.

Referring to FIG. 7, controller 110 transfers (writes) divided data piece A written in temporary storage unit 111 to first HDD 121 by access control unit 112. In parallel, controller 110 transfers (writes) divided data piece B written in temporary storage unit 111 to second HDD 122 by access control unit 112. By the above method, the normal storing process for the original data is completed.

Figure 8:
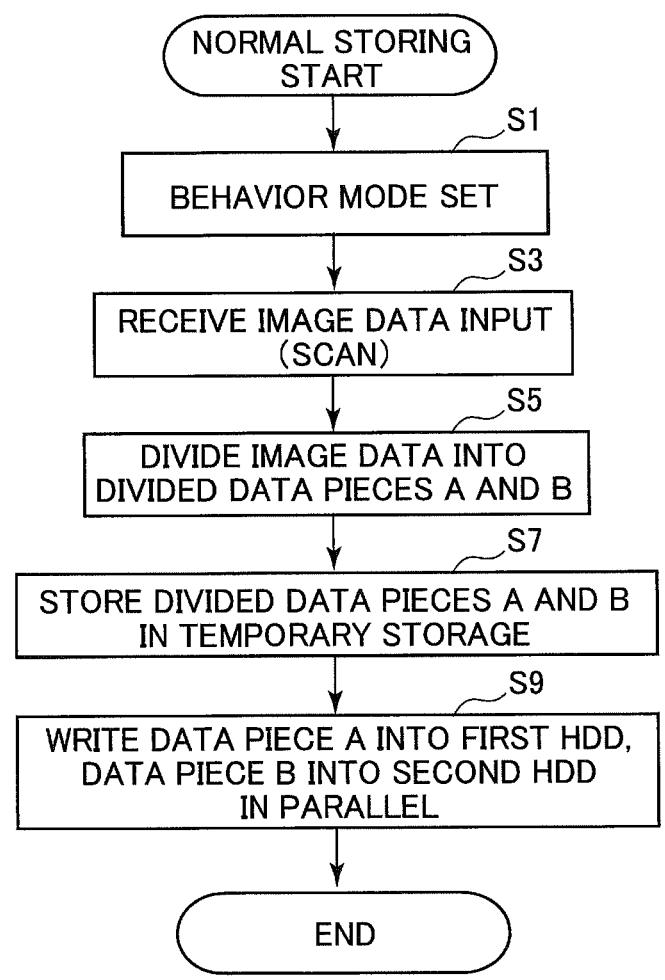
FIG. 8 shows a flowchart of the normal storing process, according to the embodiment of this invention.

FIG. 8 shows a flowchart of the normal storing process, according to the embodiment of this invention.

Referring to FIG. 8, CPU 115 receives a setting of the behavior mode of image forming apparatus 100 via an operation panel or the like (S1). Next, CPU 115 receives data input (S3). In this case, CPU 115 receives input of scanned image data. CPU 115 divides the image data into divided data pieces A and B (S5), and stores divided data pieces A and B in temporary storage unit 111 (S7). CPU 115 writes divided data piece A into first HDD 121, and writes divided data piece B into second HDD 122 (S9). These writings are done in parallel. Then, CPU 115 terminates the process.

(The Divisional Method of Image Data)

The divisional method of image data in the normal storing process will be explained.

There are the following two divisional methods, for example.

The first divisional method is for generating divided data pieces A and B by dividing image data into bit planes, when the input data is image data.

Figure 9:
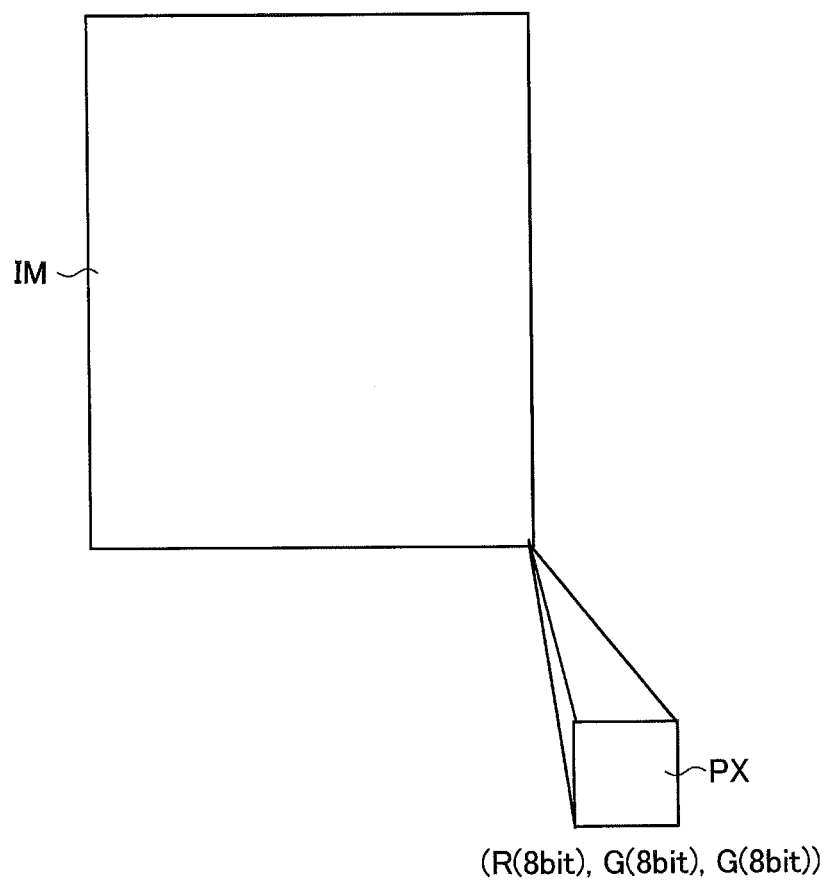
FIG. 9 conceptually shows the relationship between image data and brightness information of each of primary colors of each of a plurality of pixels which form the image data.

FIG. 9 conceptually shows the relationship between image data and brightness information of each of primary colors of each of a plurality of pixels which form the image data.

Referring to FIG. 9, image data IM is configured with a plurality of pixels PX. Each of the plurality of pixels PX has brightness information for R (red), G (green), and B (blue) of primary colors, for example. Each of the plurality of pixels PX may have brightness information for C, M, Y, and K of primary colors.

FIG. 10 schematically shows a structure of brightness information of each of primary colors of one pixel.

Referring to FIG. 10, as for an 8 bit color example, brightness information for each primary color of one pixel PX has an 8 bit data amount. More specifically, brightness information for each primary color of one pixel PX is indicated by 8-digit binary numbers.

Figure 11:
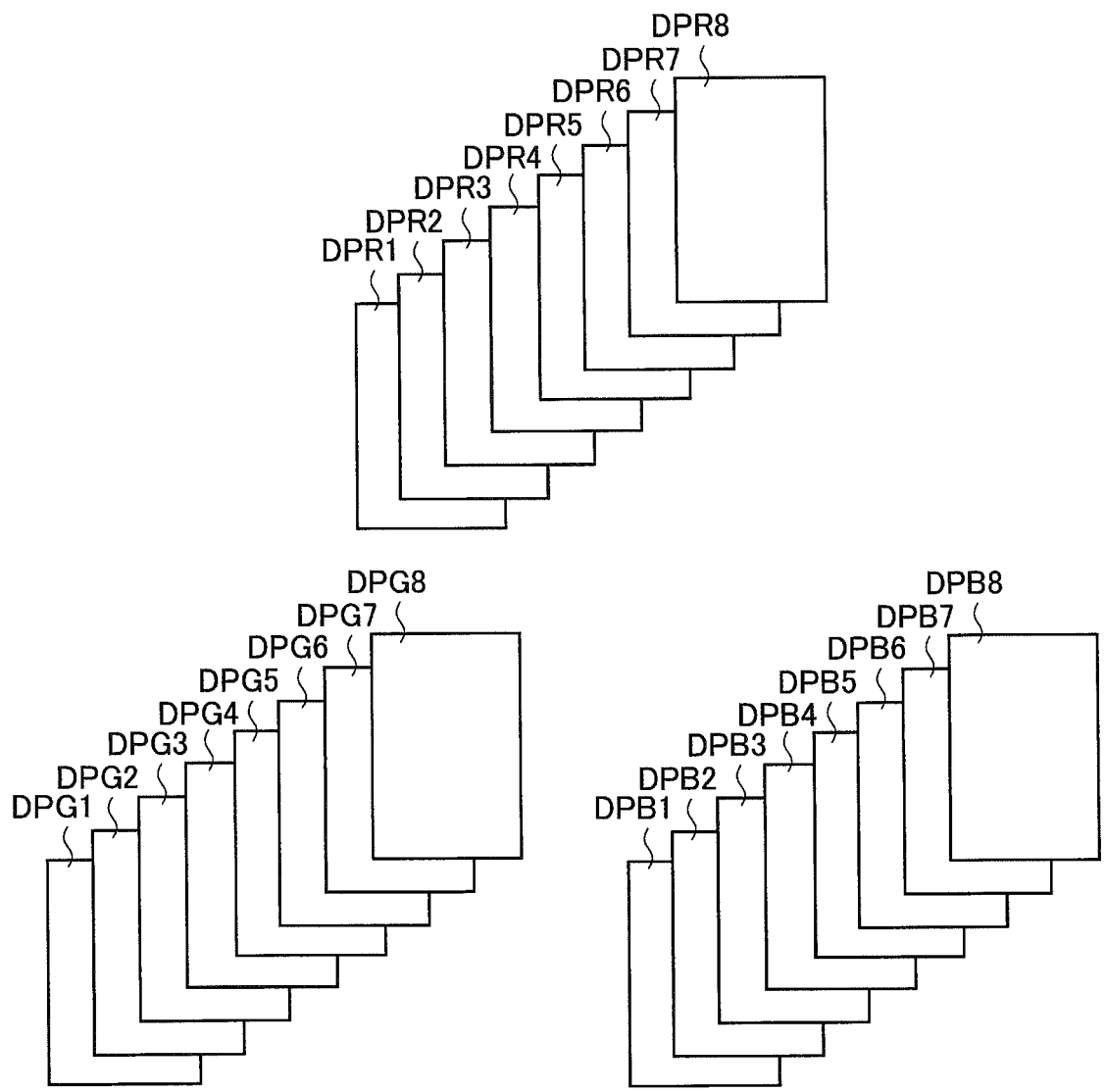
FIG. 11 schematically shows bit planes of image data.

FIG. 11 schematically shows bit planes of image data.

Referring to FIG. 11, image forming apparatus 100 generates bit plane DPR1 of image data IM by extracting a bit of the 1st digit of red from all pixels PX which form image data IM. Similarly, image forming apparatus 100 generates bit planes DPR2 to DPR8 of image data IM by extracting bits of the 2nd to 8th digits of red from all pixels PX which form image data IM. Image forming apparatus 100 generates bit planes DPG1 to DPG8 of image data IM by extracting bits of the 1st to 8th digits of green from all pixels PX which form image data IM. Image forming apparatus 100 generates bit planes DPB1 to DPB8 of image data IM by extracting bits of the 1st to 8th digits of blue from all pixels PX which form image data IM.

FIG. 12 schematically shows structures of divided data pieces A and B which were divided by the first divisional method.

Referring to FIG. 12, in case that image forming apparatus 100 divides image data IM by the first divisional method, each of divided data pieces A and B is configured with arbitrary bit planes, out of bit planes DPR1 to DPR8, DPG1 to DPG8, and DPB1 to DPB8 of image data IM.

In this example, divided data piece A is configured with bit planes DPR1, DPR3, DPR5, DPR7, DPG1, DPG3, DPG5, DPG7, DPB1, DPB3, DPB5, and DPB7. Divided data piece B is configured with bit planes DPR2, DPR4, DPR6, DPR8, DPG2, DPG4, DPG6, DPG8, DPB2, DPB4, DPB6, and DPB8.

The second divisional method is to generate divided data pieces A and B which are made by dividing the image data row by row in the sub scanning direction, when the input data is image data read by reading device 140.

Figure 13:
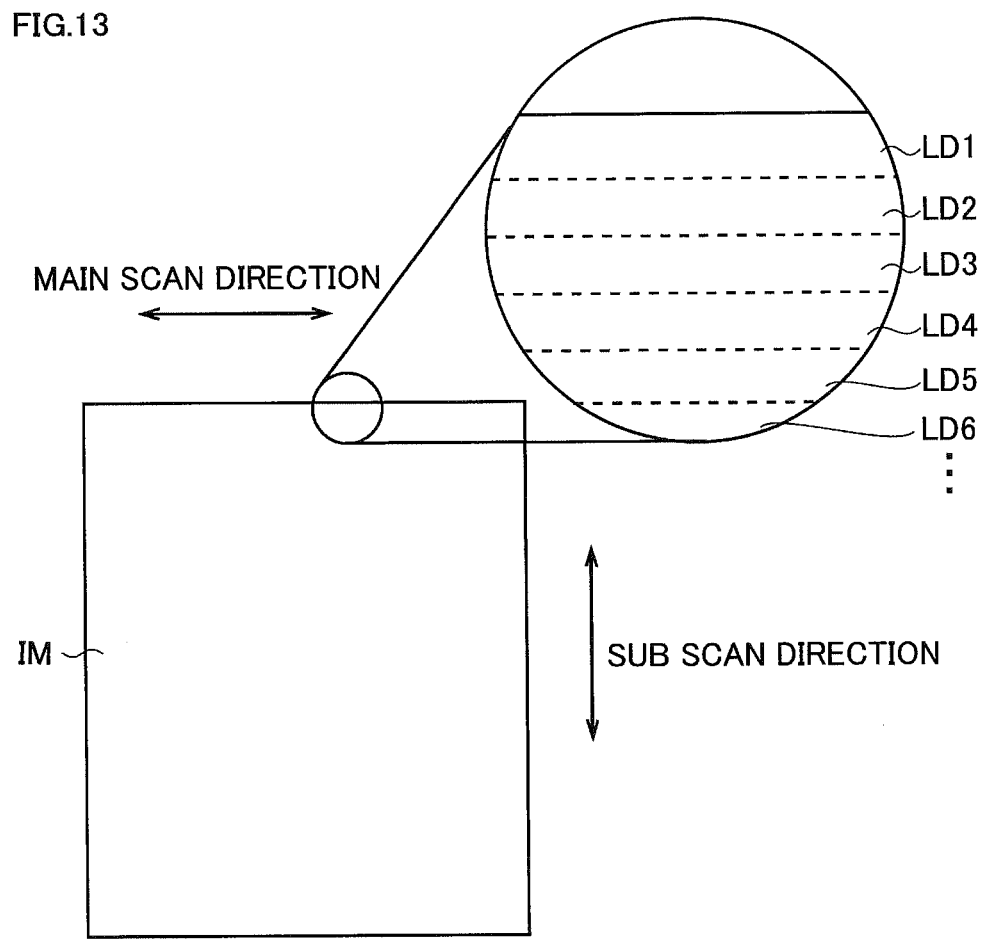
FIG. 13 schematically shows a structure of image data read by a reading device.

FIG. 13 schematically shows a structure of image data read by a reading device.

Referring to FIG. 13, image data IM includes a plurality of row data pieces LD1, LD2, LD3, LD4, LD5, LD6, . . . . Each of the plurality of row data pieces LD1, LD2, LD3, LD4, LD5, LD6, . . . is derived from dividing image data IM in the sub scanning direction row by row. Each row has a width of one pixel (a length in a longitudinal direction in FIG. 13). Here, from the top to the bottom of FIG. 13, the row data pieces of image data IM are denoted by reference numbers LD1, LD2, LD3, LD4, LD5, LD6, . . . .

FIG. 14 schematically shows structures of each of divided data pieces A and B which were divided by the second divisional method.

Referring to FIG. 14, in case that image forming apparatus 100 divides image data IM by the second divisional method, each of divided data pieces A and B are configured with arbitrary row data pieces of image data IM.

In this Figure, divided data piece A is configured with row data pieces LD1, LD3, LD5, . . . . Divided data piece B is configured with row data pieces LD2, LD4, LD6, . . . .

(An Overview of the Backup Process)

Next, an overview of the backup process will be explained.

Figure 15:
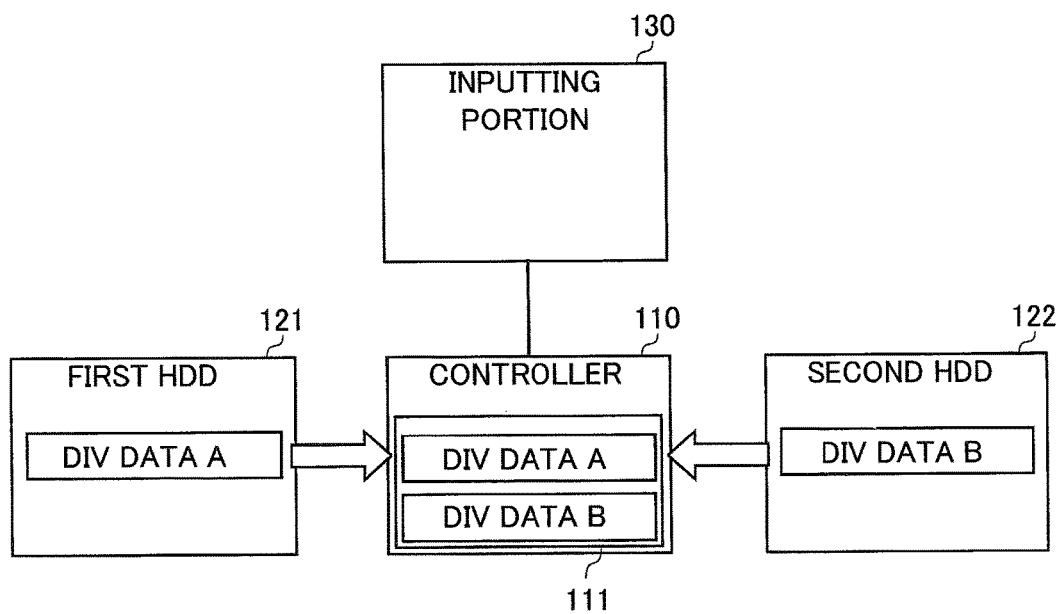
FIG. 15 is the first figure for explanation of a backup process executed by the image forming apparatus according to the embodiment of this invention.
Figure 16:
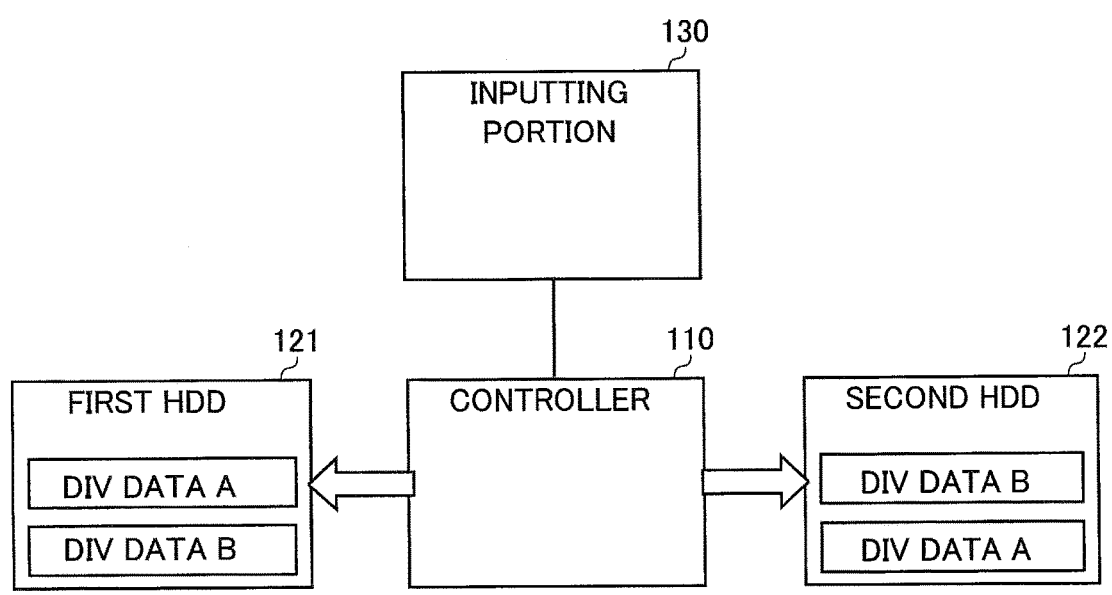
FIG. 16 is the second figure for explanation of a backup process executed by the image forming apparatus according to the embodiment of this invention.

FIGS. 15 and 16 are for explanation of a backup process executed by the image forming apparatus according to the embodiment of this invention.

Referring to FIG. 15, controller 110 determines objects for backup, out of the original data stored by the normal storing process in first HDD 121 and second HDD 122, based on a state of image forming apparatus 100. For example, image forming apparatus 100 determines the data of the type corresponds to the state of the image forming apparatus, as the backup objects.

Controller 110 copies (duplicates) each of divided data pieces A and B related to the determined data into temporary storage unit 111. Image forming apparatus 100 does not delete the original divided data pieces A and B (divided data piece A stored in first HDD 121, and divided data piece B stored in second HDD 122).

Controller 110 may not determine the objects for backup, during the backup process. In this instance, controller 110 determines all the data stored in first HDD 121 and second HDD 122 by the normal storing process as the backup objects. However, data as backup objects are preferably determined and backed up, to execute the backup process effectively.

Referring to FIG. 16, controller 110 writes each of the copied divided data pieces A and B into each of first HDD 121 and second HDD 122 by a crisscrossing method. More specifically, controller 110 makes backup (writes) the copied divided data piece A in second HDD 122, and makes backup (writes) the copied divided data piece B in first HDD 121. These backups are done in parallel (simultaneously). By the above method, the backup process of the original data is completed.

Image forming apparatus 100 preferably executes the backup process at the timing based on the state of image forming apparatus 100. More specifically, image forming apparatus 100 preferably executes the backup process at the timing determined based on a queue in image forming apparatus 100. More specifically, image forming apparatus 100 preferably calculates the quiescent time of controller 110 based on the queue, and determines the backup objects based on the calculated quiescent time.

Image forming apparatus 100 preferably executes the backup process when image forming apparatus 100 is sleeping (in an electrical power saving state) or warming up (heating a fixing device or the like).

Furthermore, image forming apparatus 100 preferably executes the backup process when image forming apparatus 100 receives an operation for turning electric power supply off.

Figure 17:
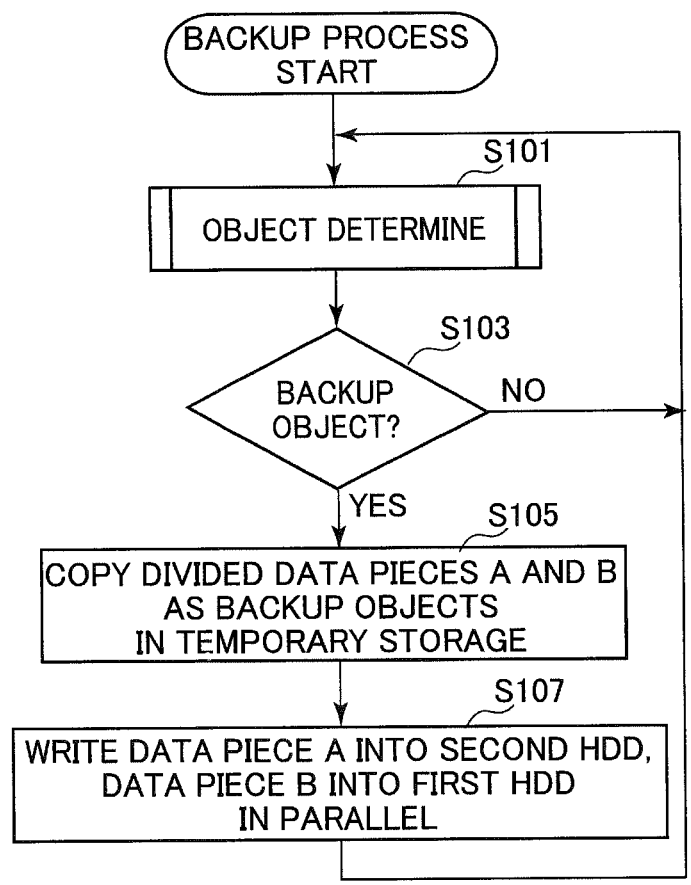
FIG. 17 shows a flowchart of a backup process, according to the embodiment of this invention.

FIG. 17 shows a flowchart of a backup process, according to the embodiment of this invention.

Referring to FIG. 17, CPU 115 executes an objective determination process (S101). The objective determination process is to determine the backup objects. Next, CPU 115 identifies whether the backup object was determined or not (S103).

At step S103, when the backup object was determined (YES at S103), CPU 115 determines that it is timing for executing backup process. CPU 115 copies divided data pieces A and B of backup object data into the temporary storage unit (S105). Next, CPU 115 writes divided data piece A in second HDD 122, and writes divided data piece B in first HDD 121 (S107). Then, CPU 115 steps in the process of step S101.

At step S103, when the backup object is not determined (NO at S103), CPU 115 determines that it is not timing for executing backup process, and steps in the process of step S101.

(The Determination Method for Backup Objects)

Next, the determination method for backup objects will be explained.

Image forming apparatus 100 preferentially determines data which is type of high priority as backup objects based on the priority table.

FIG. 18 schematically shows the priority table stored by the controller, according to the embodiment of this invention.

Referring to FIG. 18, the priority table records backup priority corresponding to the data types. In the priority table, the data types are divided into three levels of priority P1, P2 and P3. Backup priority is higher in the order of priority P1, priority P2 and priority P3.

In the priority table, the highest priority P1 is set for the data related to a facsimile receiving job, the data related to a mail receiving job, and the data stored in a box. The second highest priority P2 is set for the data related to a print job, and the data related to other receiving jobs. The lowest priority P3 is set for the data related to a copy job, the data related to a facsimile transmitting job, the data related to a mail transmitting job, and the data related to other transmitting jobs. Data types to which priority P3 is set are excluded from the backup objects.

Arbitrary priority is set for each of data types in the priority table by the administrator or the manufacturer of image forming apparatus 100. In light of importance of data related to receiving jobs of image forming apparatus 100, priority of data related to receiving jobs of image forming apparatus 100 is preferably higher than priority of data related to transmitting jobs of image forming apparatus 100. Data related to at least one of a copy job, a facsimile transmitting job, and a mail transmitting job is the lowest priority, and is preferably excluded from the backup. The necessity for the backup of the types of data is low, in data stored in image forming apparatus 100.

Figure 19:
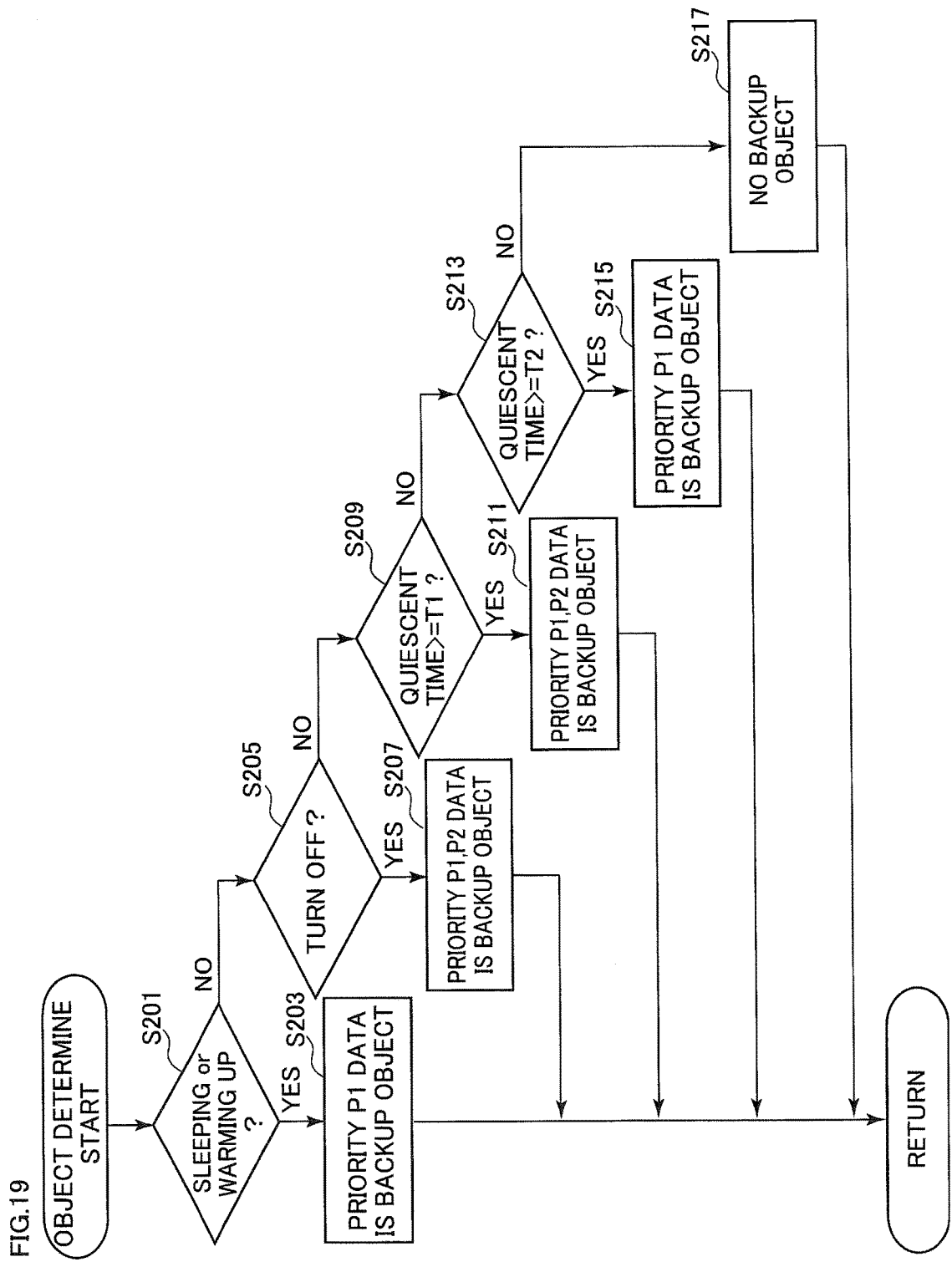
FIG. 19 shows a subroutine of the objective determination process of step S101 in FIG. 17.

FIG. 19 shows a subroutine of the objective determination process of step S101 in FIG. 17.

Referring to FIG. 19, during the objective determination process, CPU 115 determines whether image forming apparatus 100 is sleeping or warming up, or not (S201).

At step S201, when image forming apparatus 100 is sleeping or warming up (YES at S201), CPU 115 determines data of priority P1 as backup objects (S203), and returns to the main flowchart.

At step S201, when image forming apparatus 100 is not sleeping or warming up (NO at S201), CPU 115 determines whether the operation for turning electric power supply of image forming apparatus 100 off is received or not (S205).

At step S205, when the operation for turning electric power supply of image forming apparatus 100 off is received (YES at S205), CPU 115 determines that data of priority P1 and P2 as backup objects (S207), and returns to the main flowchart.

At step S205, when the operation for turning electric power supply of image forming apparatus 100 off is not received (NO at S205), CPU 115 determines whether the quiescent time of controller 110 calculated based on the queue is more than or equal to time T1, or not (S209).

At step S209, when controller 110 determines that the quiescent time of controller 110 is more than or equal to time T1 (YES at S209), CPU 115 determines that data of priority P1 and P2 as backup objects (S211), and returns to the main flowchart.

At step S209, when the quiescent time of controller 110 is less than time T1 (NO at S209), CPU 115 determines whether the quiescent time of controller 110 calculated based on the queue is more than or equal to time T2 (<time T1), or not (S213).

At step S213, when the quiescent time of controller 110 calculated based on the queue is more than or equal to time T2 (YES at S213), CPU 115 determines that data of priority P1 as backup objects (S215), and returns to the main flowchart.

At step S213, when the quiescent time of controller 110 is less than time T2 (NO at S213), CPU 115 does not determine backup objects (S217), and returns to the main flowchart.

(The Storing Areas of the HDDs)

Next, the storing areas of the HDDs will be explained.

Figure 20:
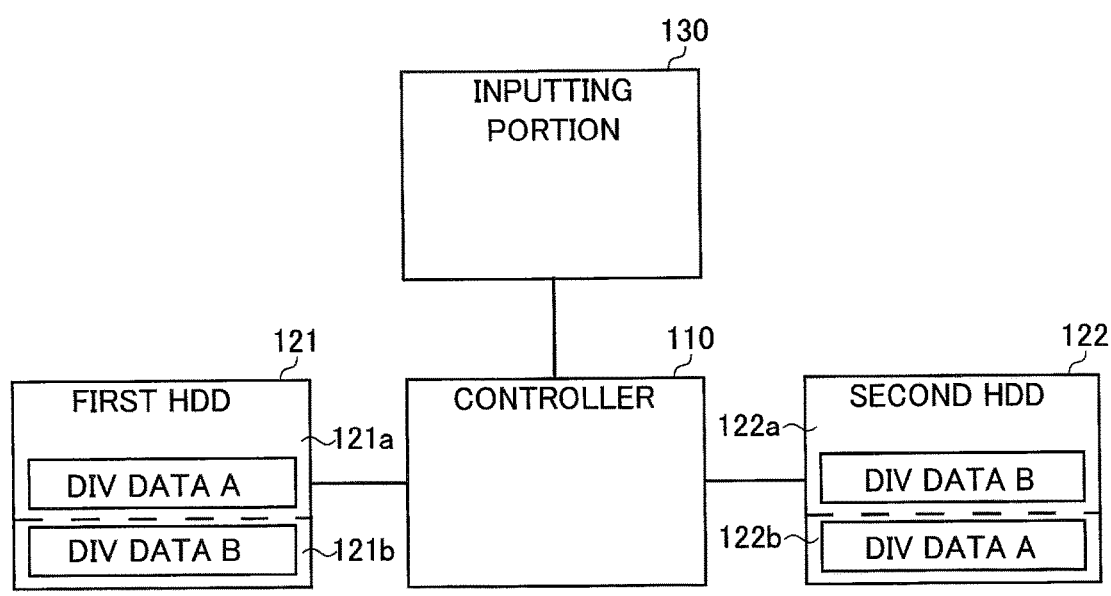
FIG. 20 schematically shows storing areas in the HDDs, according to the embodiment of this invention.

FIG. 20 schematically shows storing areas in the HDDs, according to the embodiment of this invention.

Referring to FIG. 20, the storing area of first HDD 121 includes normal storing area 121*a* and backup area 121*b*. Similarly, the storing area of second HDD 122 includes normal storing area 122*a* and backup area 122*b*.

Normal storing areas 121*a* and 122*a* (examples of the first storing area) are used for the normal storing process by controller 110. Backup areas 121*b* and 122*b* (examples of the second storing area) are storing areas used for the backup process by controller 110. Preferably, each of storing areas of first HDD 121 and second HDD 122 is divided into a storing area used for the normal storing process and a storing area used for the backup process.

Figure 21:
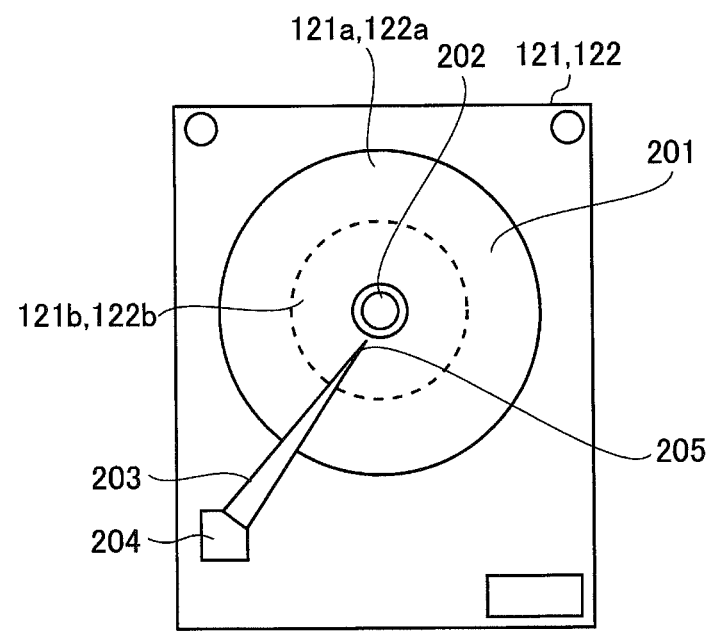
FIG. 21 schematically shows a structure of the inner part of the HDD, according to the embodiment of this invention.

FIG. 21 schematically shows a structure of the inner part of the HDD, according to the embodiment of this invention.

Referring to FIG. 21, each of first HDD 121 and second HDD 122 includes disk 201, spindle motor 202, actuators 203, voice coil motor 204, and magnetic head 205.

Disk 201 stores various data. Disk 201 may be single or contain a plurality of disks. Spindle motor 202 rotationally drives disk 201. Actuators 203 are attached to both sides of disk 201. Actuators 203 can swing about a fixed axis and move on disk 201 from the inner diameter side end to the external diameter side end. Voice coil motor 204 is attached to the base of actuators 203. Voice coil motor 204 drives actuators 203 by electromagnetic action with a magnet attached to the HDD case. Magnetic head 205 is attached to the leading end of actuator 203. Magnetic head 205 performs data writing to disk 201 and data reading from disk 201 by magnetic force.

Backup areas 121*b* and 122*b* are provided at an area of the inner diameter side of disk 201. Normal storing areas 121*a* and 122*a* are provided at the external diameter side of disk 201 rather than backup areas 121*b* and 122*b*. Herewith, normal storing process speed can be improved. Access speed at an external diameter side area of disk 201 is faster than at an inner diameter side area of disk 201.

The Effect of the Embodiment

According to the embodiment, both performance and the backup function of the storage system can be improved without increase of the cost and the installation area. In consequence, a sophisticated storage system can be achieved.

More specifically, the image forming apparatus divides input data into two divided data pieces during the normal storing process, and writes each of the divided data pieces into each of two HDDs in parallel (writes data by striping). Herewith, performance can be improved.

The image forming apparatus makes a backup of a divided data piece stored in a HDD into another HDD, to make two divided data pieces crisscross during the backup process. Herewith, in case that one HDD went down, the lost data can be restored by using data stored in another HDD. In consequence, the backup function can be improved.

Further, since two fixed storage devices can cover it, increase of the cost and the installation area can be avoided.

(The Modification of the Storage System)

Figure 22:
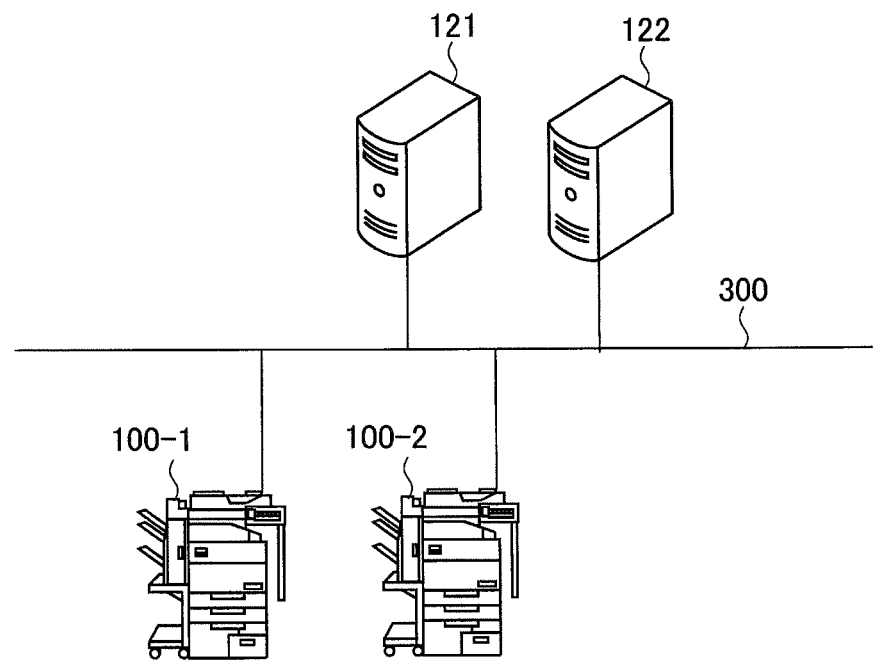
FIG. 22 shows a structure of the modified storage system, according to this invention.

FIG. 22 shows a structure of the modified storage system, according to this invention.

Referring to FIG. 22, this modified storage system is equipped with image forming apparatus 100-1 (an example of a controller), image forming apparatus 100-2 (an example of a controller), first HDD 121 (an example of the first fixed storage device), and second HDD 122 (an example of the second fixed storage device). Image forming apparatus 100-1, image forming apparatus 100-2, first HDD 121, and second HDD 122 are bilaterally connected via network 300. Image forming apparatuses 100-1 and 100-2 share first HDD 121 and second HDD 122 as storage devices. First HDD 121 and second HDD 122 may be servers.

Network 300 uses a private line, for example, a wired or wireless LAN (Local Area Network) or the like. Network 300 connects various equipment by using protocol of TCP/IP (Transmission Control Protocol/Internet Protocol). The equipment connected with network 300 can send and receive various data with each other. Network 300 may be Internet.

Controller 110 of each of image forming apparatuses 100-1 and 100-2 transfers each of divided data pieces A and B of input data to each of first HDD 121 and second HDD 122 via network 300, when data was input. Controller 110 of each of image forming apparatuses 100-1 and 100-2 copies each of transferred divided data pieces A and B into temporary storage unit 111 of each of image forming apparatuses 100-1 and 100-2 via network 300, at required timing after the transfer. Further, controller 110 of each of image forming apparatuses 100-1 and 100-2 makes backup of each of the copied divided data pieces A and B in each of second HDD 122 and first HDD 121.

According to this modification, the effect similar to the above embodiment can be achieved.

(Others)

In the above embodiment, at least one of first HDD 121 and second HDD 122 may be replaced with a SSD (Solid State Drive).

According to this invention, a sophisticated storage system, a control program for a sophisticated storage system, and a sophisticated controller can be provided.

The processes of above embodiments may be performed by software or a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the internet. The processes explained in the above flowcharts and the description are executed by a CPU in line with the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage system comprising:
    a first and a second fixed storage device;
    a temporary storage unit that stores data temporarily;
    a priority store memory that stores a priority table in which data are divided into three backup priority levels P1, P2, and P3 prioritized in that order, depending on types of the data; and
    a processor that:
        divides input data into a first and a second divided data pieces;
        writes the first and the second divided data pieces in the temporary storage unit;
        transfers the written first divided data piece to the first fixed storage device and transfers the written second divided data piece to the second fixed storage device; and
        makes a backup of the first divided data piece in the second fixed storage device and makes a backup of the second divided data piece in the first fixed storage device at a required timing after the transfer, wherein
    the storage system is an image forming apparatus,
    the processor determines a backup object according to the backup priority levels referring to the priority table,
    in the priority table, data received by the image forming apparatus has backup priority level P1 or P2, and data transmitted from the image forming apparatus has backup priority level P3, and
    the processor determines the data having a backup priority level equal to or higher than backup priority level P2 as the backup object depending on an operating state of the image forming apparatus.

2. The storage system according to claim 1, wherein the processor further:
    makes the backup of the first and the second divided data pieces determined as the backup object.

3. The storage system according to claim 1, wherein data related to at least one of a copy job, a facsimile transmitting job, and a mail transmitting job have backup priority level P3 and are not determined as the backup object.

4. The storage system according to claim 1, wherein the processor further:
    makes the backup of each of the transferred first and the second divided data pieces having backup priority levels P1 and P2 or having backup priority level P1 at a timing based on a queue in the image forming apparatus.

5. The storage system according to claim 1, wherein the processor further:
    makes the backup of each of the transferred first and the second divided data pieces having backup priority level P1 when the image forming apparatus is sleeping or warming up.

6. The storage system according to claim 1, wherein the processor further:
    makes the backup of each of the transferred first and the second divided data pieces having backup priority levels P1 and P2 when an operation for turning off the electric power supply of the image forming apparatus is received.

7. The storage system according to claim 1, wherein the processor further:
    generates the first and the second divided data pieces, by dividing image data into bit planes, when input data is the image data.

8. The storage system according to claim 1, wherein the processor further:
    generates the first and the second divided data pieces, by dividing image data row by row in a sub scanning direction, when the input data is read image data.

9. The storage system according to claim 1, wherein each of the first and the second fixed storage devices is configured with an HDD (Hard Disk Drive) or an SSD (Solid State Drive).

10. The storage system according to claim 1, wherein each of the first and the second fixed storage devices includes:

a first storing area to which the first or the second divided data piece is transferred, and a second storing area in which the first or the second divided data piece is backed up.

11. The storage system according to claim 10, wherein each of the first and the second fixed storage devices is configured with an HDD, and the first storing area is provided at external diameter side of a disk of the HDD, rather than the second storing area.

12. The storage system according to claim 1, wherein the processor further:

copies the transferred first and second divided data pieces into the temporary storage unit at the required timing after the transfer.

13. A non-transitory computer-readable recording medium storing a controlling program for a storage system which has a first and a second fixed storage devices, a temporary storage unit for storing data temporarily, and a priority store memory that stores a priority table in which data are divided into three backup priority levels P1, P2, and P3 prioritized in that order, depending on types of the data, wherein the program causes a computer to:

divide input data into a first and a second divided data pieces;

write the first and the second divided data pieces in the temporary storage unit;

transfer the written first divided data piece to the first fixed storage device and transfer the written second divided data piece to the second fixed storage device; and make a backup of the first divided data piece in the second fixed storage device and make a backup of the second divided data piece in the first fixed storage device at a required timing after the transfer, wherein the storage system is an image forming apparatus, the program causes a computer to determine a backup object according to the backup priority levels referring to the priority table, in the priority table, data received by the image forming apparatus has backup priority level P1 or P2, and data transmitted from the image forming apparatus has backup priority level P3, and the program causes a computer to determine the data having a backup priority level equal to or higher than backup priority level P2 as the backup object depending on an operating state of the image forming apparatus.

14. The non-transitory computer-readable recording medium according to claim 13, wherein data related to at least one of a copy job, a facsimile transmitting job, and a mail transmitting job have backup priority level P3 and are not determined as the backup object.

15. The non-transitory computer-readable recording medium according to claim 13, wherein the program further causes the computer to:

copy the transferred first and second divided data pieces into the temporary storage unit at the required timing after the transfer.

16. A controller that communicates with a first and a second fixed storage device, the controller comprising:

a temporary storage unit that stores data temporarily;

a priority store memory that stores a priority table in which data are divided into three backup priority levels P1, P2, and P3 prioritized in that order, depending on types of the data; and a processor that:

divides input data into a first and a second divided data pieces;

writes the first and the second divided data pieces in the temporary storage unit;

transfers the written first divided data piece to the first fixed storage device and transfers the written second divided data piece to the second fixed storage device; and makes a backup of the first divided data piece in the second fixed storage device and makes a backup of the second divided data piece in the first fixed storage device at a required timing after the transfer, wherein the controller is included in an image forming apparatus, the processor determines a backup object according to the backup priority levels referring to the priority table, in the priority table, data received by the image forming apparatus has a higher backup priority level P1 or P2, and data transmitted from the image forming apparatus has backup priority level P3, and the processor determines the data having a backup priority level equal to or higher than backup priority level P2 as the backup object depending on an operating state of the image forming apparatus.

17. The controller according to claim 16, wherein data related to at least one of a copy job, a facsimile transmitting job, and a mail transmitting job have backup priority level P3 and are not determined as the backup object.

18. The controller according to claim 16, wherein the processor further:

copies the transferred first and second divided data pieces into the temporary storage unit at the required timing after the transfer.

* * * * *